(12) United States Patent
Kato et al.

(10) Patent No.: US 8,127,298 B2
(45) Date of Patent: Feb. 28, 2012

(54) OPERATIONS MANAGEMENT APPARATUS OF INFORMATION-PROCESSING SYSTEM

(75) Inventors: Takeshi Kato, Akishima (JP); Jun Okitsu, Yokohama (JP); Tatsuya Saito, Kunitachi (JP); Yoko Shiga, Singapore (SG); Shinichi Hayashi, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/003,675

(22) PCT Filed: Mar. 5, 2009

(86) PCT No.: PCT/JP2009/054190
§ 371 (c)(1),
(2), (4) Date: Jan. 11, 2011

(87) PCT Pub. No.: WO2010/050249
PCT Pub. Date: May 6, 2010

(65) Prior Publication Data
US 2011/0126206 A1    May 26, 2011

(30) Foreign Application Priority Data
Oct. 30, 2008  (JP) ................................. 2008-279339

(51) Int. Cl.
*G06F 9/50* (2006.01)
*G06F 1/32* (2006.01)
*G06F 15/173* (2006.01)

(52) U.S. Cl. ......... 718/104; 718/105; 713/320; 709/226
(58) Field of Classification Search .................. None
See application file for complete search history.

(56) References Cited

U.S. PATENT DOCUMENTS
6,795,928 B2 * 9/2004 Bradley et al. ............... 713/320
7,818,594 B2 * 10/2010 Gorbatov et al. ............ 713/320
(Continued)

FOREIGN PATENT DOCUMENTS
JP    2004-126968 A    4/2004
(Continued)

*Primary Examiner* — Qing Wu
(74) *Attorney, Agent, or Firm* — Mattingly & Malur, PC

(57) ABSTRACT

Information processing equipment and power/cooling facilities are managed together for power savings without degrading system processing performance. An operations management apparatus 60 is connected to an equipment group $20_1$ to $20_q$ and facilities $40_1$ to $40_u$ and $50_1$ to $50_v$. The operations management apparatus 60 includes: a database 64 which stores a history of positions and operation information 61 of the equipment group of $20_1$ to $20_q$ and facilities $40_1$ to $40_u$ and $50_1$ to $50_v$, and workloads $30_1$ to $30_r$ of the equipment group of $20_1$ to $20_q$. An index value of workloads from the history is calculated and the workloads $30_1$ to $30_r$ are allocated to the equipments $20_1$ to $20_q$. In addition, the operations management apparatus 60 allocates the workloads $30_1$ to $30_r$.

14 Claims, 7 Drawing Sheets

U.S. PATENT DOCUMENTS

| | | |
|---|---|---|
| 2003/0177406 A1* | 9/2003 | Bradley et al. ............... 713/300 |
| 2005/0251802 A1 | 11/2005 | Bozek et al. |
| 2006/0259621 A1 | 11/2006 | Ranganathan et al. |
| 2006/0259793 A1 | 11/2006 | Moore et al. |
| 2007/0180117 A1 | 8/2007 | Matsumoto et al. |

FOREIGN PATENT DOCUMENTS

| | | |
|---|---|---|
| JP | 2004240669 | 8/2004 |
| JP | 2005063066 | 3/2005 |
| JP | 2005-531047 A | 10/2005 |
| JP | 2005-312142 A | 11/2005 |
| JP | 2006285317 | 10/2006 |
| JP | 2006344162 | 12/2006 |
| JP | 2007-179437 A | 7/2007 |
| JP | 2007-536657 A | 12/2007 |
| JP | 2008-128599 A | 6/2008 |
| WO | 03/079171 A2 | 9/2003 |
| WO | 03083693 | 10/2003 |

* cited by examiner

OPERATIONS MANAGEMENT APPARATUS OF INFORMATION-PROCESSING SYSTEM

TECHNICAL FIELD

The present invention relates to an operations management apparatus for an information-processing system formed of an information-processing equipments, such as a server, a storage, and a network, and also their facilities performing power supplying or cooling, and more particularly, the present invention relates to a method suitable for performing integrative power-conscious operations management of the information-processing equipments and also the facilities.

BACKGROUND ART

For example, in Japanese Patent Application Laid-Open Publication (Translation of PCT Application) No. 2007-536657 (Patent Document 1), in a system formed of a plurality of servers and a management server, power consumption of the system is reduced by consolidation by means for virtualization. When the management server detects a resource utilization or power consumption representing workloads of the servers via a monitoring agent and a detected value of a certain server is determined as being smaller than a threshold value, a virtual machine in that server is caused to dynamically migrate to another server, and power supply of the original server is cut off. For threshold determination, detected instantaneous values or average values are used. As resource utilization, a utilization of a processor, a memory, or the like is used.

In Japanese Patent Application Laid-Open Publication (Translation of PCT Application) No. 2005-531047 (Patent Document 2), in a method of managing power consumption of a server pool formed of a plurality of servers, the number of servers satisfying a total demand of an immediate workload is determined, and power consumption is managed by energizing or cutting-off the servers. To a current workload, a raised value (lower limit) or an excessive value (upper limit) is added, and when the workload that the currently operating server can handle is smaller than the lower-limit value, an operating server is added. When the workload exceeds the upper-limit value, the number of the servers is decreased. In order to follow a total demand of workloads by increasing or decreasing the number of servers, it is assumed that each workload has a sufficiently short life in terms of time, such as electronic commerce and Web applications.

In Patent Document 2, for a metric of workloads, processor utilization, memory utilization, network bandwidth utilization, and disk bandwidth utilization are used. As a raised value and an excessive value, a minimum deviation and a maximum deviation, respectively, of a workload observed within a history time frame are used, and also, by comparing and searching an actual workload demand and power consumption with respect to a history size of the workloads and settings of the raised value and the excessive value, finding an optimum setting is performed. For a repetitive and cyclic workload spike in days, weeks, or others, a flag is set at an operation schedule of a server pool for handling. Also, a server to be operated in accordance with a position of a cooling fan in a server chassis and a fault location is controlled.

In U.S. Patent Application Publication No. 2006/0259621 (Patent Document 3), in a method of allocating workloads to a plurality of servers in a data center, a profile of a workload requested is compared with a history profile, and the requested workload is allocated to a server according to a history in which the power of the server and an air conditioner is minimum. If no matching history is present, random allocation is made. The history profile includes positions and classes of the servers, types of the workloads and their utilization, injection and emission air temperatures, and power of the server and air conditioner. The power of the server and air conditioner is obtained from injection and emission air temperatures of the server, a specific heat, and the volume of air, or is measured by a power meter. As a history profile, an instantaneous value is regularly collected at short intervals (one to ten minutes) or long intervals (one to six months), and additionally, in the case of irregular collection within one day, when an event such as new allocation of a workload or a change of server arrangement is taken as a trigger, an experiment may be performed in which the allocation, type, utilization, and others of the workloads are changed in a wide range.

In Japanese Patent Application Laid-Open Publication No. 2005-312142 (Patent Document 4), in a system of managing power consumption of a building, power consumption is measured by sectioning the building and devices that are present therein. When power in a certain section exceeds a threshold value, a warning is issued to manage the power of the entire building to support power saving. The building is sectioned in floors, and the devices are sectioned in types, such as an information device and an air conditioner. A threshold value for each section is set with the use of an average value of power consumption in consideration of a deviation value.

Patent Document 1: Japanese Patent Application Laid-Open Publication (Translation of PCT Application) No. 2007-536657

Patent Document 2: Japanese Patent Application Laid-Open Publication (Translation of PCT Application) No. 2005-531047

Patent Document 3: U.S. Patent Application Publication No. 2006/0259621

Patent Document 4: Japanese Patent Application Laid-Open Publication No. 2005-312142

DISCLOSURE OF THE INVENTION

Problems to be Solved by the Invention

With the rapid development of information communications in recent years and, furthermore, toward an era of a merger between broadcasting and communications, information-processing equipments are expected to be increased explosively. On the other hand, to reduce carbon dioxide toward prevention of global warming, power consumption of information-processing equipments are required to be significantly reduced. In particular, in a data center serving as an information-processing infrastructure at the backend, in addition to power consumed by an information-processing equipments, power consumed by facilities performing power supplying and cooling occupies a large share of power, posing an important problem of comprehensive power reduction in the equipments and the facilities.

For power saving of the data center, respective efforts have been started in the information-processing equipments, such as a server, storage, and a network, the power facility, the cooling facility, and system operations management. In the information-processing equipments, an improvement of performance per power consumption with low-power device/circuits and adoption of a power-saving function by switching between active/idle states according to a workload have proceeded. In the power facility, a reduction of loss and an improvement of conversion efficiency of a power supplying system from a transformer, an uninterruptible power supply, a switchboard, a distributor, and others to a power supply of the equipments have been started, and, in the cooling facility, an improvement of operating efficiency of an air conditioner itself, optimization of an air-flow design of an air-supply and exhaust opening and, furthermore, introduction of local cooling and liquid cooling have been started. In operations management, operating information monitoring, job scheduling and, furthermore, an improvement of operation efficiency of the equipments by virtualization and its consolidation are listed as main measures.

For power saving by taking the information-processing equipments as a system, the workloads and power consumption of the equipments are required to be managed; however, these are not stationary, but show various behaviors depending on the processing mode and the application of the system. For example, the workloads and power consumption of the equipments are changed in a complex manner in a time series by batch processing and real-time processing, online processing and offline processing, interactive processing, transaction processing, real-time control processing, database processing and technical computing, and others. When taken as time waveforms, there are various changes, such as pulse-like, burst-like, spike-like, and vibration-like ones and those with regularity, periodicity, randomness, and 1/f fluctuations.

While the power facility and the cooling facility are generally designed based on a maximum rated power of the equipments, the efficiency and power of the facilities upon operation greatly depends on the distribution and fluctuations of power of the equipments with respect to the facilities. For example, since the power conversion efficiency depends on a power load, a power-supplying loss is varied depending on the operation power of the equipments and the power supplying system. Moreover, since the efficiency of an air conditioner depends on the power of the equipment, that is, heat, a positional relation and distance between the air conditioner and the equipment, temperature, volume of air, wind direction, and others, cooling power is greatly influenced by the power and location of the equipments.

In the future, it is expected that operations management by virtualization of a data center will expand and consolidation and live migration will be utilized for power saving; and thus, it will be required a measure of reducing the power of the equipments and a total power including the facilities by appropriately controlling allocation of workloads to the equipments and the operating capability of the facilities, while sufficiently considering time-series changes of workloads of the equipments and power distribution fluctuations of the equipments with respect to the facilities. Conventionally, while several examples are known as operations management methods regarding equipments, such as a server and a computer, and an air-conditioning facility, the conventional methods remain to take a stationary or temporal approach for the fluctuations with time described above and a local or sequential approach for comprehensive power saving of the equipments and the facility.

For example, in Patent Document 1, by using a dynamic migration of a virtual machine to decrease the number of operating servers, power consumption of a system is reduced. While a server with a low workload is extracted as a target for stopping operation, when servers with different performances and power efficiencies are present in a mixed manner, the power of the entire system may be more reduced by consolidating the virtual machine into the target server. Also, while instantaneous values or average values of workloads are used to determine whether a migration is possible, when fluctuations and vibrations are large with respect to the average values, the workloads instantaneously exceeds the processing performance in the server where the virtual machine is consolidated, thereby possibly causing a degradation in performance. Here, power supplying and cooling to the server are not mentioned in the document.

In Patent Document 2, waste of power consumption of a server pool is avoided by causing the number of operating servers to follow a total demand of workloads. It is premised therein that the life of each workload is sufficiently short and workloads at each operating server is sufficiently large, and the case where a plurality of servers differ each other, the case where workloads fluctuates at each server, the case where workloads of various applications are mixed, and other cases are not taken into consideration. For determination of the number of servers, a current value of workloads and peak values (minimum deviation and maximum deviation) within a history time frame are used, and thus, in a specific application, if changes of workloads are slow or periodic, an appropriate time frame or flag can be easily set, but if there are various servers and applications and fluctuations of workloads are large, a difference between the minimum value and the maximum value, that is, a range of a decision condition is too broad to define an appropriate number of servers, thereby making efficient consolidation impossible. Moreover, while a server to be operated is selected based on the arrangement of a cooling fan or a faulty part inside of a server chassis, if they are across a plurality of chassis, the selection is at random without consideration of an air-conditioning environment around the chassis, and it is thus difficult to say that power saving in view of facilities is sufficient.

In Patent Document 3, by allocating a requested workload to a server based on a history profile which minimizes power of servers and an air conditioner, the power of the server and the air-conditioning facility together is reduced. This technique does not work if a history applicable for the request is not present within a history range, or power is reduced only in a sequential way according to the accumulation of history. Moreover, although the history includes the position of the servers and power together with the air conditioner, an influence of the position of the servers to the air conditioner is not taken into consideration, and allocation of a workload to a server appearing in the history does not necessarily minimize a total power of the server group and the air conditioning facility. A request and a history are contrasted with an instantaneous value and, even once a workload is allocated according to an applicable history, when the workload is fluctuated with time, the state may become diverging from the state of the referred history to increase power.

In Patent Document 4, when the measured power consumption of an information device or an air-conditioning device exceeds a threshold value, a warning is issued for managing the power. Although the threshold value is set in consideration of an average value and a deviation value of the power, the deviation value is a dimensionless number indicating a relative position of a numerical value with respect to a population distribution, and a method of setting a threshold value having a dimension of a physical quantity of power is not specifically described in the document. Moreover, although power saving is supported by warning, a method of allocating a workload to an information device or a method of controlling an air-conditioning device with respect to a thermal load is not described in the document.

As described above, in the conventional technologies, there is a problem in which, not only that the information-processing equipments and the workloads as targets are restrictive, but also that the instantaneous value, the average value, the minimum/maximum deviations, and others are used in the workload allocation to the equipments, and power consumption of the equipments is merely temporarily reduced with respect to time-series changes of the workloads. Moreover, also regarding a total power of the equipments and the facility together, the improvement remains local or sequential. A main object of the present invention is to achieve a power-saving operation of an information-processing system typified by a data center by appropriately controlling allocation of workloads to an equipments and operating capability of facilities so as to adapt to a mixture of various equipments and workloads, time-series changes of the workloads of the equipments, and fluctuations of a power distribution of the equipments with respect to facilities. The above and other preferred aims and novel characteristics of the present invention will be apparent from the description of the present specification and the accompanying drawings.

Means for Solving the Problems

A summary of a typical embodiment of the inventions disclosed in the present application will be briefly described as follows.

A feature of a typical embodiment of the present invention is that an operations management apparatus for an information-processing system formed of an information-processing equipments stores a history of workloads of the equipments, obtains an index value of a workload based on a summary statistic including a central tendency and a dispersion in a time-series variation in the history, allocates workloads as prioritizing an apparatus with high power efficiency of the apparatus performance so as to reduce a total sum of power consumption of the equipments, while limiting the index value within a predetermined threshold value range (for index value) of the equipments.

The history of the workloads includes quantitative information required for determining the workload allocation according to a type of the information-processing equipment. Examples are a processor utilization, a memory usage capacity or utilization, a disk transfer rate or bandwidth utilization, and a network transfer rate or bandwidth utilization for a server; IOPS (input/output throughput), and a usage capacity or utilization for a storage; and a transfer throughput and a delay time for a network.

The history is obtained so as to sufficiently grasp time-series changes of a workload. When the workload is relatively constant, the history is obtained regularly, and when the workload is changed, the history is variably obtained so as to be adapted to the change. Also, when the history is obtained in a planned manner according to a periodicity or a schedule of the workload, the history is obtained, in some cases, by taking an event as a trigger, such as addition or deletion of equipments or a workload or an arrangement change or a failure of equipments or a facility.

The summary statistic includes a central tendency and a dispersion calculated from the history, indicating trends of the workload. As a central tendency, a moving average value, a moving median value, or a moving mode value is used; and, as a dispersion, a standard deviation, a quartile deviation, a mean deviation, or the like is used. If changes of the workload are nearly in a normal distribution, a combination of a moving average and a standard deviation is mainly used. However, for example, when the distribution is unbalanced, a combination of a moving median value and a quartile deviation may be used as required.

The summary statistic is calculated as necessary upon update of the history and is stored together with the history, or is calculated upon a trigger of changing the workload allocation according to an operational policy. In the former case, for compression of the data capacity of the history, the summary statistic may be stored as a history in place of raw data of the workload. In the latter case, an increase or decrease of workloads of the entire equipments or each equipment, schedule of workloads, and a failure of equipment can be a trigger.

The index value is calculated based on the central tendency and the dispersion indicating time-series trends, and can be a prospective value having a statistical probability in consideration of a change range of a workload. Unlike an instantaneous value or an average value in Patent Document 1 or Patent Document 3, the index value is used to probabilistically prevent workloads from exceeding the processing performance of the apparatus to maintain the system processing performance of the entire equipments and, unlike a minimum value and a maximum value in Patent Document 2, the index value are used to avoid an decision criteria of the workload allocation from expanding and to efficiently consolidate the workloads.

The threshold value range (for index value) of the equipment is set according to an operation policy with respect to a type and a processing mode of the workload. For example, the upper limit of the threshold value is set to be lower for a real-time processing, and is set to be higher for a batch processing and, in this manner, a degradation of processing performance due to a sudden increase of workloads is prevented in the former case, and operational efficiency of the equipment can be increased in the latter case. A lower limit of the threshold value is set as required. Also, for each equipment, a threshold value range (for detection) is defined, which is wider than or equal to the threshold value range (for index value), and the time when the index value calculated iteratively deviates from this threshold value range (for detection) can be used as a trigger for changing workload allocation.

The power efficiency of the equipment performance is a value obtained by dividing the performance of the equipment by power consumption, and is defined according to the type and processing mode of workload. Information about performance, power, and power efficiency is included as part of system management information in specification information, configuration information, operations monitoring information, and others. By allocating workloads by prioritizing equipment with high power efficiency while limiting the index value of the workload within the threshold value range (for index value), efficient consolidation is achieved while sustaining the performance of processing the workloads, thereby reducing a total power consumption of the entire equipments. In equipment to which no workload is allocated, a power-saving is performed according to an operational policy, such as stand-by, sleep, or power-off.

Another feature of the typical embodiment of the present invention is that an operations management apparatus for an information-processing system formed of an information-processing equipments and facilities performing power supplying and cooling allocates a workload based on power efficiency of equipment performance in consideration of power consumption of the equipment and also a power-supplying loss or cooling power of the facilities while limiting an index value of the workload within a threshold value range (for index value) of the equipment.

Power consumption of equipments is varied according to the quantity of workloads, a power-supplying loss of facilities depends on a power supplying system to the equipments and a power distribution of the equipments, and cooling power depends on the location of cooling facilities with respect to the equipments and a thermal load distribution (power distribution) or a temperature distribution of the equipments, and therefore, the power-supplying loss and the cooling power are influenced by the physical location and workload allocation of the equipments. By allocating workloads by using comprehensive power efficiency obtained by adding partial sensitivity of the power-supplying loss or the cooling power with respect to each equipment and a power efficiency of the equipments themselves, a total sum of the power consumption of the equipments and the power-supplying loss or the cooling power of the facility can be reduced.

A further feature of the embodiment of the present invention is described by using equations. A power consumption $p_{Di}$ of equipment i (i=1, 2, ... ) is as expressed in Equation 1, with a metric variable set representing a workload j (j=1, 2, ... ) being taken as $L_j$, and a total power $P_D$ of the equipments can be represented as Equation 2.

[Equation 1]
$$p_{Di} = p_{Di}(L_j) \tag{1}$$

[Equation 2]
$$P_D = \sum_i p_{Di}(L_j) \tag{2}$$

Power $P_F$ (power-supplying loss or cooling power) of facility is represented as Equation 3, with the power of the equipment i being taken as $P_{Di}$ and its position being taken as $x_i$, and total power P of the equipments and the facility can be represented as Equation 4.

[Equation 3]
$$P_F = P_F((p_{D1}, x_1), (p_{D2}, x_2), \dots ) \tag{3}$$

[Equation 4]
$$P = P_D + P_F = \sum_i p_{Di}(L_j) + P_F( \dots , p_{Di}(L_j), \dots ) \tag{4}$$

Since $P_D$ or P is a function of $p_{Di}$ ($L_j$), a problem of reducing the total power $P_D$ of the equipments or a problem of reducing the total power P of the equipments and the facility is, after all, a combination optimization problem for finding an optimum solution of allocating the workload j to the equipment i, with $P_D$ or P being taken as an objective function. To solve the optimization problem, it is not practical to perform full searches of a solution space of enormous combinations. Thus, to efficiently find a solution, an approximate solution algorithm is used in which the equipments is ranked based on power efficiency of the equipment performance, and a workload is preferentially allocated to equipment of a higher rank. Power efficiency $\epsilon_{Di}$ of the equipment i can be represented as Equation 5 with a performance $\gamma_i$ and the power consumption $p_{Di}$ of the equipment i. Power efficiency $\epsilon_i$ also in consideration of the power of the facility can be represented as Equation 6, with a partial sensitivity with respect to the equipment power $P_{Di}$ at the facility power $P_F$ being taken as $P_{Fi}$.

[Equation 5]
$$\epsilon_{Di} = \frac{\gamma_i(L_j)}{p_{Di}(L_j)} \tag{5}$$

[Equation 6]
$$\epsilon_i = \frac{\gamma_i(L_j)}{p_{Di}(L_j) + P_{Fi}(p_{Di}(L_j))} \tag{6}$$

When the workload j is allocated to the equipment i according to the priority, if the workload j exceeds a maximum performance of the equipment i due to time-series changes of the workload j, the processing time is disadvantageously prolonged and, if the workload j falls short of the maximum performance, a divergence from the optimum solution disadvantageously occurs. Thus, a probable index value of the workload j in the light of time-series changes is required to be estimated.

Out of a variable set $L_j$ representing the workload j, one variable $l_j$ predominant over the performance and power of the equipment is taken as an example, and, when a moving average value $m_j(t)$ and a standard deviation $\sigma_j(t)$ are used as a central tendency and a dispersion at a time t of history of $l_j$, an index value $\xi_j$ regarding the variable $l_j$ of the workload j can be represented as Equation 7. "n" is a constant number, and is set in consideration of the type and processing mode of the workload j, a contradictory condition between an effect of power saving by consolidation of workloads and a danger of a decrease in processing performance, and others.

[Equation 7]
$$\xi_j(t) = m_j(t) \pm n \cdot \sigma_j(t) \tag{7}$$

A condition to be satisfied by the index value $\xi_j$ when the workload j is allocated to the equipment i can be represented as Equation 8, with a lower limit of a threshold value range (for index value) of the equipment i being taken as $a_i$ and an upper limit thereof being taken as $b_i$. If changes of the workload j are nearly in a normal distribution, a probability that the actual workload j falls within the threshold value range (for index value) can be predicted, and thus, while avoiding a decrease in processing performance based on statistical likelihood (probability), workloads can be efficiently consolidated to the equipments.

[Equation 8]
$$\left. \begin{array}{l} a_i < \xi_j(t) < b_i \\ a_i < m_j(t) - n \cdot \sigma_j(t), m_j(t) + n \cdot \sigma_j(t) < b_i \end{array} \right\} \tag{8}$$

When the number of samples upon calculating the moving average value $m_j(t)$ and the standard deviation $\sigma_j(t)$ is taken as $\nu$, Equation 7 can be rewritten as Equation 9 or Equation 10, with a standard error being taken as $\delta_j(t)$, a population moving average value being taken as $m'_j(t)$, and a population standard deviation being taken as $\sigma'_j(t)$. Equation 7, Equation 9, and Equation 10 are similar to one another, and the number of samples $\nu$ may be included when a constant number n is set.

[Equation 9]
$$\left. \begin{array}{l} \delta_j(t) = \frac{\sigma_j(t)}{\sqrt{\nu}} \\ \xi_j(t) = m_j(t) \pm n \cdot \left(1 + \frac{1}{\sqrt{\nu}}\right) \cdot \sigma_j(t) \end{array} \right\} \tag{9}$$

[Equation 10]

$$m'_j(t) = m_j(t)$$
$$\sigma'_j(t) = \sqrt{\frac{v}{v-1}} \cdot \sigma_j(t)$$
$$\xi_j(t) = m_j(t) \pm n \cdot \sqrt{\frac{v}{v-1}} \cdot \sigma_j(t)$$

(10)

The number of samples v and a time interval for obtaining the samples are set according to a change rate and variations of the workloads. Regarding a moving average value in a long time range, changes in that range tend to be missed. In a short range, minute changes tend to be affected, and, if the time interval is too short, the amount of data of history is enormous, and therefore practically appropriate samples are extracted. Also, for cooling the equipments, heat capacity is involved and thus the temperature does not follow changes of the workloads and power of the equipments immediately, but changes with a thermal time constant. For the cooling facility, a moving average value in a time range corresponding to the thermal time constant is used.

When a plurality of workloads k (k=1, 2, . . . ) are allocated to one piece of equipment for consolidation, the index value $\xi_s$ is represented as Equation 11 with a composite moving average value $m_s(t)$ and a composite standard deviation $\sigma_s(t)$. A threshold value condition can be considered similarly to Equation 8.

[Equation 11]

$$m_s(t) = \sum_k m_k(t)$$
$$\sigma_s(t) = \sqrt{\sum_k \sigma_k(t)^2}$$
$$\xi_s(t) = m_s(t) \pm n \cdot \sigma_s(t)$$

(11)

When a workload j at certain equipment i is migrated to another equipment h, a migration is required in some cases, such as when the variable is a relative resource utilization. For example, a transformation is made as Equation 12, with a maximum performance of the equipment i being taken as $\gamma_{iMAX}$ and a maximum performance of the equipment h being taken as $\gamma_{hMAX}$.

[Equation 12]

$$m_i(t) \rightarrow \frac{\gamma_{iMAX}}{\gamma_{hMAX}} \cdot m_i(t)$$
$$\sigma_i(t) \rightarrow \frac{\gamma_{iMAX}}{\gamma_{hMAX}} \cdot \sigma_i(t)$$
$$\xi_i(t) \rightarrow \frac{\gamma_{iMAX}}{\gamma_{hMAX}} \cdot \xi_i(t)$$

(12)

Here, the power efficiencies $\epsilon_{Di}$ and $\epsilon_i$ shown in Equation 5 and Equation 6 are functions of the variable set $L_j$ of the workload j, and the power efficiencies $\epsilon_{Di}$ and $\epsilon_i$ are required to be calculated according to a combination of workload allocations for ranking of the equipments. If the performance $\gamma_i$, the power consumption $p_{Di}$, and a partial sensitivity $P_{Fi}$ can be linearly-approximated with respect to the main variable $l_j$, by substituting a specific value into the variable $l_j$, the power efficiencies $\epsilon_{Di}$ and $\epsilon_i$ can be handled as constants, as in Equation 13; and therefore, ranking of the equipments can be simplified, thereby more efficiently finding an approximate solution. $p_{DiMAX}$ is a maximum rated power of the equipment i.

[Equation 13]

$$\epsilon_{Di} = \frac{\gamma_i(b_i)}{p_{Di}(b_i)} \text{ or } \frac{\gamma_{iMAX}}{p_{DiMAX}}$$
$$\epsilon_i = \frac{\gamma_i(b_i)}{p_{Di}(b_i) + P_{Fi}(p_{Di}(b_i))} \text{ or } \frac{\gamma_{iMAX}}{p_{DiMAX} + P_{Fi}(p_{DiMAX})}$$

(13)

A probability $\phi$ that the actual workload j allocated to the equipment i deviates from the threshold value range (for index value) shown in Equation 8 can be represented as Equation 14, with a minimum value that can be taken as the variable $l_j$ being taken as $\alpha_j$, a maximum value being taken as $\beta_j$, and a probability density function indicating a change distribution of a workload j being taken as $\phi_j (l_j)$. Similarly, probability $\phi'$ that the actual workload j exceeds the upper limit $b_i$ of the threshold value range (for index value) can be represented as Equation 15.

[Equation 14]

$$\psi = 1 - \int_{a_i}^{b_i} \varphi_j(l_j)$$
$$1 = \int_{\alpha_i}^{\beta_i} \varphi_j(l_j)$$

(14)

[Equation 15]

$$\psi' = \int_{b_i}^{\beta_i} \varphi_j(l_j)$$

(15)

A sum of probabilities $\phi$ over the entire workload-allocated equipments is useful for considering a period (cycle) of updating workload allocation. In the case where the actual workload j deviates from the threshold value range (for detection) of the equipment or when a frequency of such deviation is increased, workload allocation may be updated upon that case as a trigger. Also, by taking the sum of the probabilities $\phi'$ into consideration, such consideration serves as a guideline for determining a degree at which ones of equipments not allocated with a workload are caused to be on stand-by and the rest of equipments is caused to be in a sleep mode and determining a degree of margin with which the power facilities and the cooling facilities are controlled.

In Equation 7, the moving average value $m_j(t)$ and the standard deviation $\sigma_j(t)$ of history are used as the index value $\xi_j$ of the workload j. Furthermore, workload allocation can be performed based on future prediction by using a statistical technique. Examples of a time-series data predicting technique include a regression analysis, frequency analysis, cross-correlation, and an autoregressive moving average model, and, if history has periodicity, such as by days or by weeks, an auto-correlation analysis can be used, for example. An index value $\xi_j$ at a time t+$\Delta$t can be represented as Equation 16 with a predicted value being taken as $\mu_j$ and a confidence interval being taken as $\lambda_j$.

[Equation 16]

$$\xi_j(t+\Delta t) = \mu_j(t+\Delta t) \pm n \cdot \lambda_j(t+\Delta t)$$

(16)

A concept of a threshold value range (for index value), power efficiency of equipment performance, and deviation probability in future predication is similar to that of Equation 8, Equation 5, Equation 6, Equation 14, and others. According to a future prediction, equipment can be energized in advance for stand-by before the workloads are started to be increased or before the workload allocation is updated, and the workloads are consolidated early before the workloads are started to be decreased for power saving. Similarly, also in an aspect of facilities, the power facility is controlled so as to sufficiently provide power of the equipments as necessary and increase power-feeding efficiency, the cooling facility is controlled with precedence upon an increase or decrease of workloads in consideration of heat capacity or thermal time constant, thereby performing power-saving operation of the facilities.

Effects of the Invention

To briefly describe effects obtained from a typical embodiment of the invention disclosed in the present application, in an information-processing system such as a data center, by allocating workloads to an information-processing equipments in a consolidated manner, it is possible to reduce a total power consumption of an equipments and, furthermore, power supplying/cooling facilities, without decreasing system processing performance of the equipments.

BRIEF DESCRIPTIONS OF THE DRAWINGS

Figure 1:
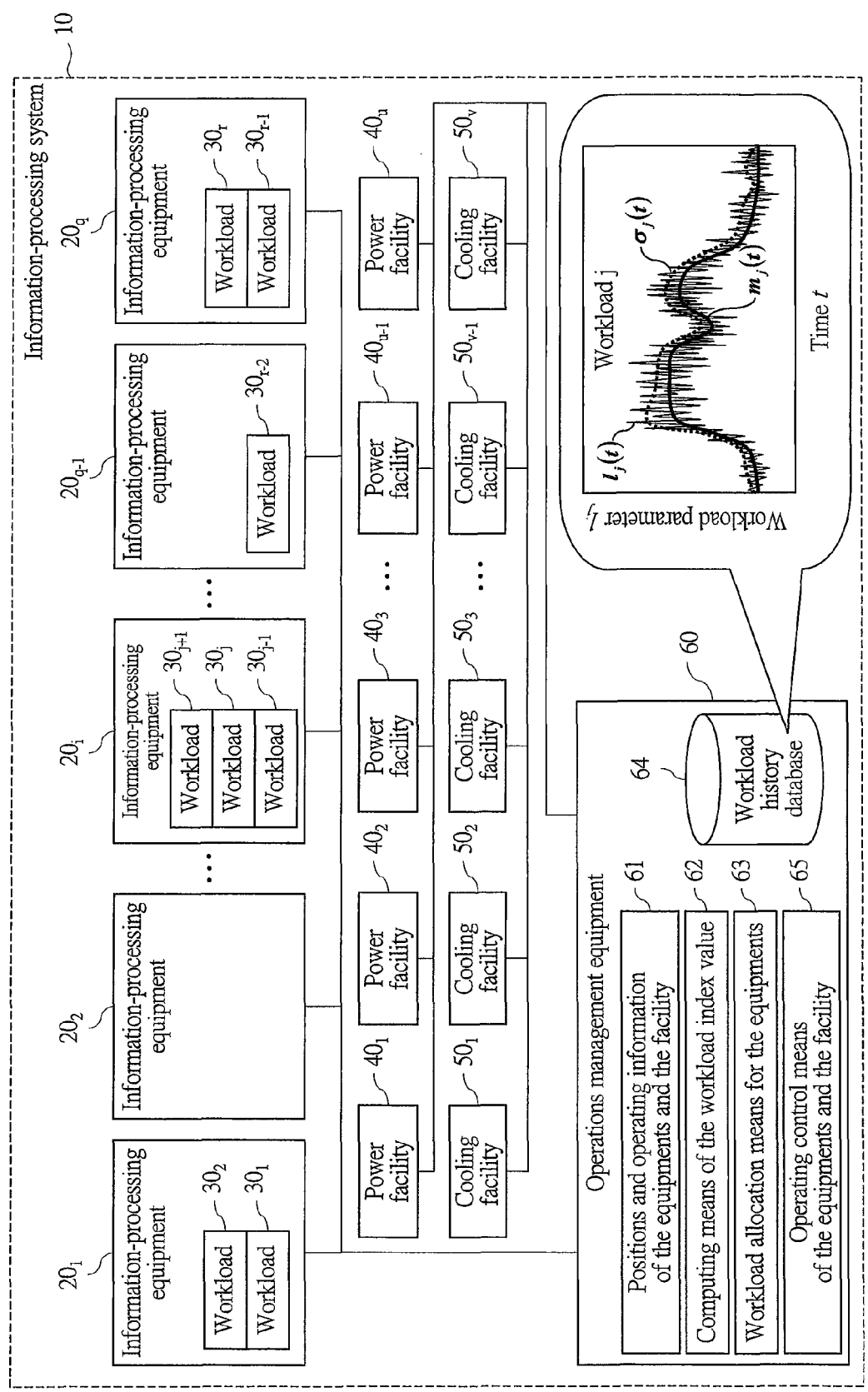
FIG. 1 is an entire structural diagram illustrating an example of an information-processing system in an operations management apparatus for the information-processing system according to a first embodiment of the present invention.
Figure 6:
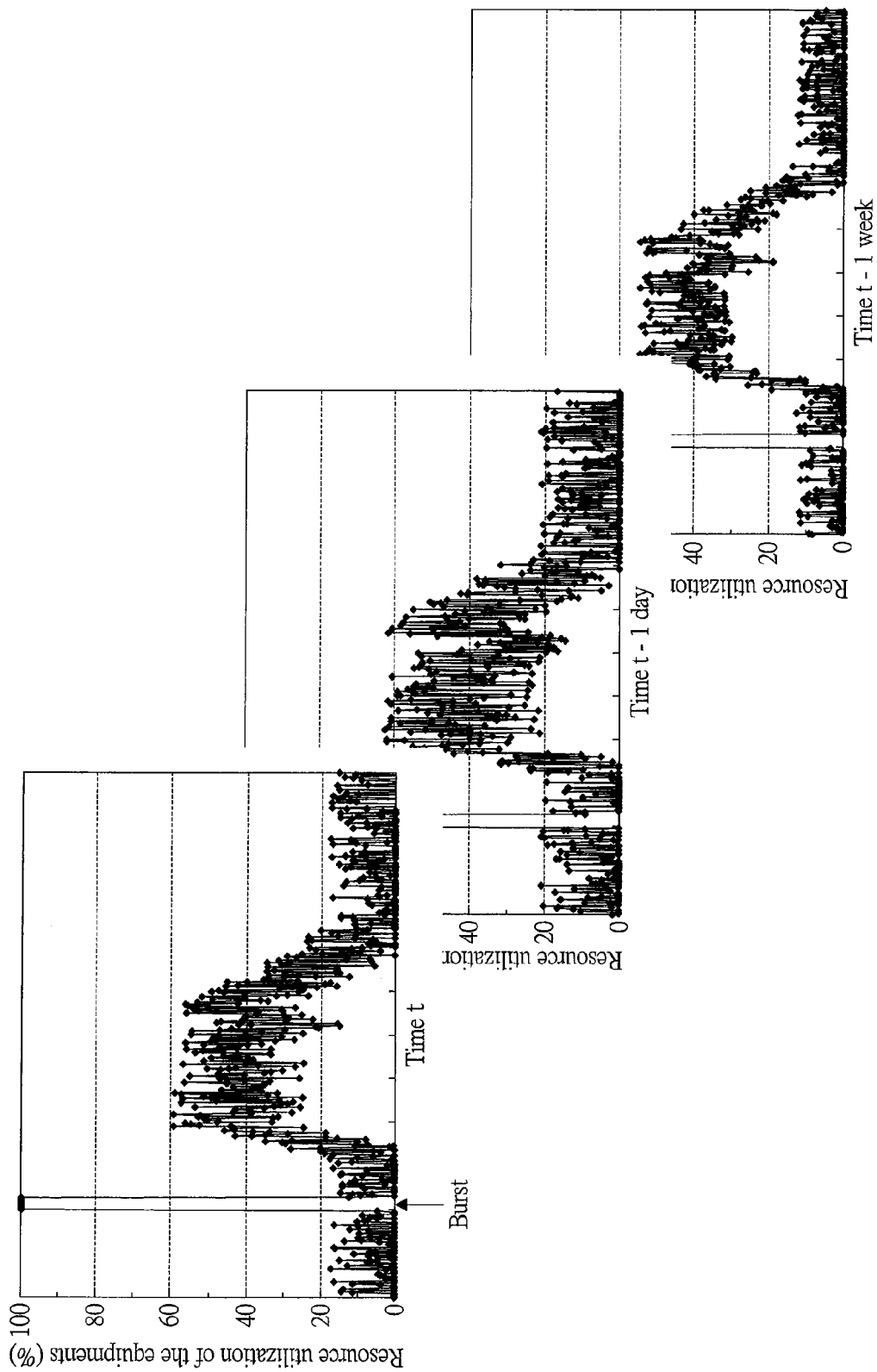
Figure 7:
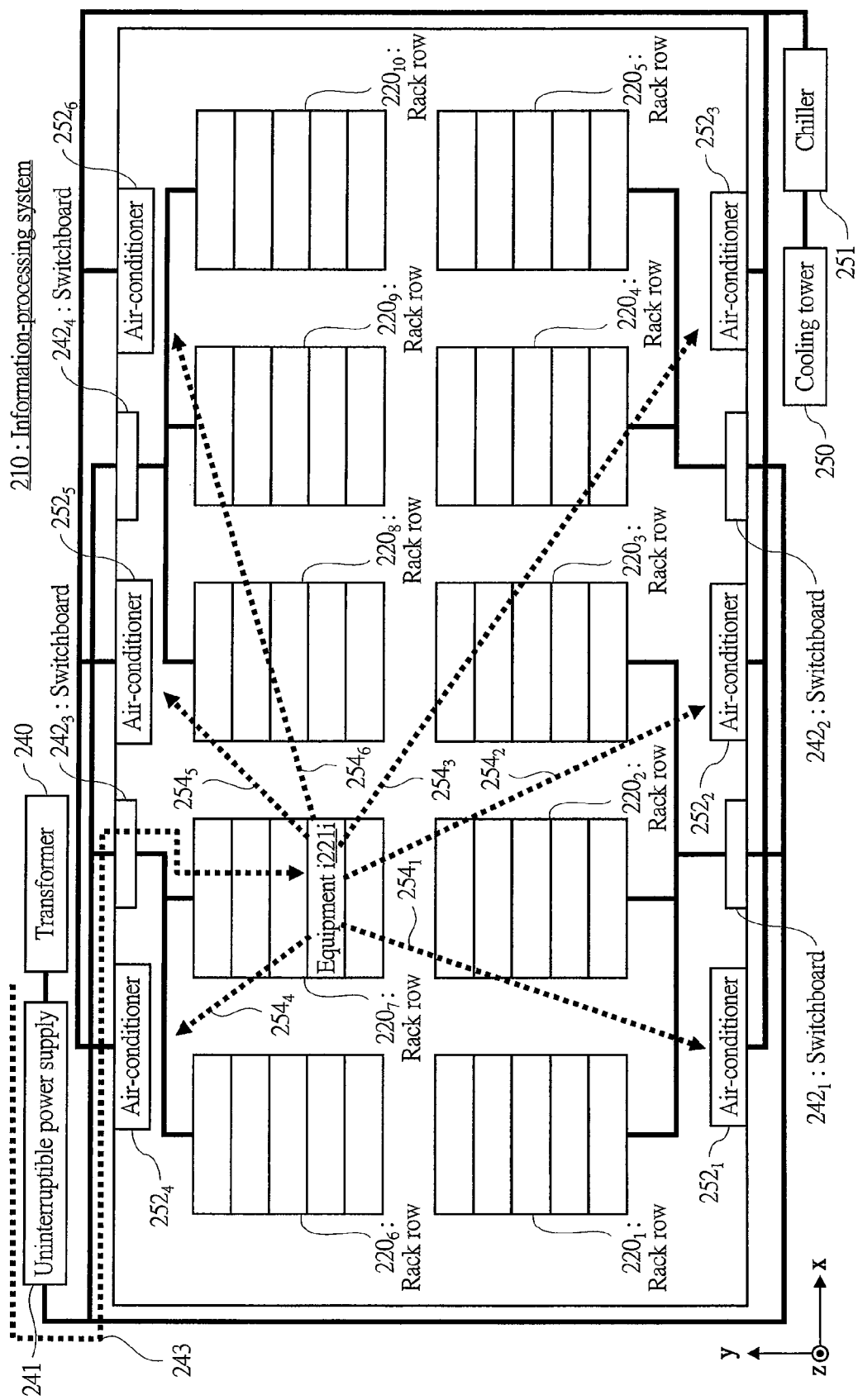

FIG. 6 is a descriptive diagram illustrating an example of a detailed operation of means for calculating a workload index value of FIG. 1 in an operations management apparatus for an information-processing system according to a sixth embodiment of the present invention; and FIG. 7 is a layout diagram illustrating an example of arrangement structure of an entire information-processing system in an operations management apparatus for the information-processing system according to a seventh embodiment of the present invention.

DESCRIPTIONS OF SYMBOLS

10 Information system;
$20_1$-$20_q$ Information-processing equipment;
$30_1$-$30_r$ Workload;
$40_1$-$40_u$ Power facility;
$50_1$-$50_v$ Cooling facility;
60 Operations management apparatus;
61 Positions and operating information of the equipments and the facilities;
62 Computing means of the workload index value;
63 Workload allocation means for the equipments;
64 Workload history database;
65 Operation control means of the equipments and the facilities;
210 Information-processing system;
$220_1$-$220_{10}$ Rack row;
$221_i$ Equipment i;
241 Uninterruptible power supply;
$242_1$-$242_4$ Switchboard;
240 Transformer;
250 Cooling tower;
251 Chiller;
$252_1$-$252_6$ Air-conditioner; and
$254_1$-$254_6$ Arrow.

BEST MODE FOR CARRYING OUT THE INVENTION

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate or similar shapes and the like are included therein unless otherwise stated or except the case where it is conceivable that they are apparently excluded in principle. The same goes for the numerical value and the range mentioned above.

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

FIG. 1 is an entire structural diagram illustrating an example of an information-processing system in an operations management apparatus for the information-processing system according to a first embodiment of the present invention. An information-processing system 10 includes information-processing equipments $20_1$ to $20_q$, power facilities $40_1$ to $40_u$ supplying power to an equipments of $20_i$ to $20_q$, cooling facilities $50_1$ to $50_v$ cooling the equipments of $20_1$ to $20_q$, and an operations management apparatus 60 managing the equipments of $20_1$ to $20_q$ and the facilities $40_1$ to $40_u$ and $50_1$ to $50_v$.

Workloads $30_1$ to $30_r$ are allocated to the equipments of $20_1$ to $20_q$. As illustrated in an example illustrated in FIG. 1, as for the workloads $30_1$ to $30_r$, a single workload may be allocated to equipment (the equipment $20_{q-1}$ and the load $30_{r-2}$), a plurality of workloads may be allocated (the apparatus $20_1$ and the workloads $30_1$ to $30_2$, the apparatus $20_i$ and the workloads $30_{j-1}$ to $30_{j+1}$, and the equipment $20_q$ and the workload $30_{r-1}$ to $30_r$), and no workload may be allocated (the equipment $20_2$).

The operations management apparatus 60 is connected to the equipments of $20_1$ to $20_q$ and the facilities $40_1$ to $40_u$ and $50_1$ to $50_v$, retains positions and operating information 61 regarding the equipments of $20_1$ to $20_q$ and the facilities $40_1$ to $40_u$ and $50_1$ to $50_v$, and includes: a database 64 for obtaining and storing a history of workloads of the equipments of $20_1$ to $20_q$; means 62 computing an index value of the workload from the history; and means 63 allocating the workloads $30_1$ to $30_r$ to the equipments of $20_1$ to $20_q$. Further, the operations management apparatus 60 includes means 65 of controlling various operation states, for example, starting the equipments of $20_1$ to $20_q$, controlling the amount of fed power from the power facilities $40_1$ to $40_u$, and starting the cooling facilities $50_1$ to $50_v$ and controlling the volume of air.

The operating information 61 regarding the equipments of $20_1$ to $20_q$ includes: data indicating types, processing patterns, and resource utilization of the workloads $30_1$ to $30_r$; data indicating processing performances, power consumptions, and operation states of the equipments $20_1$ to $20_q$; and others. The operating information 61 regarding the facilities $40_1$ to $40_u$ and $50_1$ to $50_v$ includes: environment monitoring data, such as temperature, humidity, an amount of flow; power supplying states of the power facilities $40_1$ to $40_u$ and supplied power to the equipments of $20_1$ to $20_q$ therefrom; and operating states of the cooling facilities $50_1$ to $50_v$ and thermal load thereof received from the equipments of $20_1$ to $20_q$.

From the operating information 61 regarding the equipments of $20_1$ to $20_q$, power consumption characteristics of equipment with respect to a workload or a function of workload and power consumption can be obtained, thereby calculating power efficiency of the equipment performance as expressed in Equation 5. From the positions and operating information regarding the equipments of $20_1$ to $20_q$ and the facilities $40_1$ to $40_u$ and $50_1$ to $50_v$, a power load distribution in a power supplying system of the power facilities $40_1$ to $40_u$ and a thermal load distribution among the equipments of $20_1$ to $20_q$ with respect to the cooling facilities $50_1$ to $50_v$ can be obtained, thereby calculating a power-supplying loss and cooling power and finding power efficiency including the power-supplying loss and cooling power as expressed in Equation 6. According to accuracy and efficiency of an approximate solution in workload allocation problems, simple power efficiency as expressed in Equation 13 may be adopted in place of the power efficiency as expressed in Equations 5 and 6.

In the history database 64, for example, a value $l_j(t)$ at a time t of a metric variable $l_j$ representing a workload j ($30_j$) is stored on an anytime basis, and a central tendency $m_j(t)$ and a dispersion $\sigma_j(t)$ at the time t are calculated as a summary statistic in time series variation of $l_j(t)$ by the computing means for the workload index value 62, thereby finding the index value $\xi_j(t)$ of the workload j as expressed in Equation 7.

Similarly, regarding the workloads $30_1$ to $30_r$, an index value $\xi_{1\,to\,r}(t)$ is obtained from a central tendency $m_{1\,to\,r}(t)$ and a dispersion $\sigma_{1\,to\,r}(t)$.

The means 63 which allocates the workloads $30_1$ to $30_r$ to the equipments of $20_1$ to $20_q$, while limiting the index value of each of the workloads $30_1$ to $30_r$ within a threshold value range (for index value), that is, an assumed processing performance range, of the respective equipments $20_1$ to $20_q$, sequentially allocates the workloads as prioritizing equipment with high power efficiency. For example, in the equipment $20_i$, workloads j−1, j, and j+1 are allocated so that a composite index value of the workloads j−1, j, and j+1 as expressed in Equation 11 is within the threshold value range (for index value) as expressed in Equation 8. As for the ranking of workload allocation, it is preferable to solve, through an arithmetic operation, a combination optimization problem to find an optimum solution for allocating the workload j to the equipment i with $P_D$ in Equation 3 or P in Equation 4 as an objective function. In this case, however, the amount of arithmetic operation on a practical basis is possibly enormous, and therefore, preferably, an approximate solution is defined according to granularity of the workloads and a constraint with the equipment and, basically, a large workload is allocated first to equipment with high power efficiency.

Specifically, for example, the ranking of the power efficiency of each equipment of the group of $20_1$ to $20_q$ obtained from the operating information 61 and the ranking of the size of each of the workloads $30_1$ to $30_r$ obtained from the computing mean of the workload index value 62 (that is, $m_j(t) + \sigma_j(t)$ or, in some case, $m_j(t)$ may suffice) are used. Here, if it is assumed that the ranking in which equipments with higher efficiency comes first is such as the equipments $20_1$, $20_2$, $20_3$, ... and the ranking in which a larger workload comes first is such as the workloads $30_1$, $30_2$, $30_3$, ..., the workload $30_1$ is allocated to the equipment $20_1$, the workload $30_2$ is allocated to the equipment $20_1$ if possible or to the equipment $20_2$ if impossible; and the workload $30_3$ is allocated to the equipment $20_1$ if possible, to the equipment $20_2$ if impossible, or to the equipment $20_3$ if still impossible.

In this manner, according to the operations management apparatus for the information-processing system 10 described in the first embodiment, index values of the workloads $30_1$ to $30_r$ are obtained based on the summary statistic in time series variations of the history database 64 and, while these index values are limited within the threshold value ranges (for the index values) of the equipments $20_1$ to $20_q$, the workloads are allocated as prioritizing equipment with high power efficiency of the equipment performance; in this manner, power consumption of the equipments of $20_1$ to $20_q$ in the information-processing system 10 can be reduced, and further, by using power efficiency including the power-supplying loss and cooling power, a total power consumption of the equipments of $20_1$ to $20_q$ also including the facilities $40_1$ to $40_u$ and $50_1$ to $50_v$ can be effectively reduced.

The workload allocation to the equipments of $20_1$ to $20_q$ can be updated according to a desired trigger and a plan, an introduction of a new workload, an end of an existing workload, and others, thereby achieving a power-saving operation of the information-processing system 10. Also, when an actual workload is varied as deviating from a threshold value range (for detection) wider than or equal to a threshold value range (for index value), the workload allocation is changed with this being taken as a trigger, thereby supporting peculiar time series variations of the workload. Furthermore, in preparation for such cases, in consideration of a deviation probability as expressed in Equation 14 and Equation 15, a part of the equipments is caused in advance to wait without power-off. By taking measures of providing a margin of power supplying capability and cooling capability of a facility, for example, it is possible to flexibly handle fluctuations of workloads without excessively wasting power of the equipments and facilities.

For example, in Equation 15, the product of probability $\phi'$ that the workload j exceeds a threshold upper limit $b_i$ and a load variable $l_j$ represents an amount of workload exceeding the upper limit $b_i$ in a sense of probability. A total sum of the products is taken over the entire equipments, a part of the equipments is caused to be stand-by so as to be able to afford a processing capability corresponding to the amount of workloads of that total sum, and a margin is provided to a power facility or cooling facility so that it can afford power. In this manner, even if the actual workload deviates from the threshold value range (for index value), the processing capability and facility capability of the entire equipments can be immediately caused to follow, thereby eliminating the occurrence of a fault. Here, this control of causing a part of the equipments to be in stand-by and providing a margin to a power facility or cooling facility so that it can afford power is performed by the operating control means 65 of the equipments and the facilities. For example, from a relational expression between the amount of workloads and equipment power, a power of the equipments corresponding to a deviation probability is found, a part of the plurality of power sources or the like configuring the power facilities is caused to be in stand-by so that it can supply that power, and a part of a plurality of air conditioners or the like configuring cooling facilities so that it can cool that power, that is, the amount of heat. In this manner, even when the workload actually deviates, power supplying and cooling can be performed in full measure, and unnecessary power can be eliminated more than the case in which all power sources and air conditioners are operated all the time.

While a data center or a computer room is typical as the information-processing system 10, the operations management apparatus of the present embodiment can also be used in a business operational system for industrial facilities, commercial facilities, communication facilities, transportation facilities, or others. Also, the apparatus is useful not only for operations management of an existing system but also as a design/diagnostic tool for system's new construction, additional setup, relocation, renovation, and others. Even in a system across a plurality of facilities or locations, the present embodiment can be implemented with remote management.

The information-processing equipments $20_1$ to $20_q$ include server equipments, storage equipments, network equipments, and others; the server equipments include general-purpose servers, dedicated servers, mainframes, parallel computers, supercomputers, embedded computers, personal computers, and others; the storage devices include magnetic disks, solid state disks, optical disks, tapes, and others; the network devices include routers, switches, hubs, and others; and, furthermore, peripheral devices include a printer, a copier, a modem, a display, and others. Still further, the present embodiment can also be applied to equipment having a demand-base switching function, so-called power-saving mode, among operation/stand-by/sleep/stop states. An example of a server is DBS, an example of storage is MAID, and an example of a network is a port power control. The present embodiment can be used variously in a hardware mode including, but not being limited to, a blade type, a rack-mount type, a tower type, and a dedicated enclosure type.

The workloads $30_1$ to $30_r$ refer to applications for server equipments; access data for storage devices; and transfer data for network equipment; and others. Data of the operating information 61 include performance, resource utilization, action/suspend state, and others for the server equipment; the number of activated disks and input/output throughput for the storage equipment; the number of transfer packets and switching frequency for the network equipment; and others. Also, as types and processing modes of workload, it is possible to distinguishably consider fixed/floating-point arithmetic operation, transaction processing, database processing, technical computation, the format and granularity of data, guaranteed band, and others in the workload allocation. That is, for example, when the equipments $20_1$ to $20_q$ have a hardware configuration being good at a specific workload, the processing performance is changed according to the type of workload and the power efficiency is changed accordingly. Therefore, according to this type, the ranking of equipments with higher power efficiency coming first as described above may be switched.

The power facilities $40_1$ to $40_u$ include transformers, uninterruptible power supply equipments, switchboards, distributors, power supplies of racks where the equipments are mounted, and others, and also include power sensors, current/voltage sensors, electrical leakage sensors, and others. In some cases, a powerhouse, a power transmission facility, and a transforming facility of a power supplying source; and a power source of equipments at a power-fed side are also subjects. The cooling facilities $50_1$ to $50_v$ include air conditioners, chillers, cooling towers, input and exhaust ports, fans, ducts, coolant pipings, and others, and also include temperature sensors, humidity sensors, flow amount/current sensors, and others disposed indoors and outdoors. In some cases, liquid-cooling equipments, local cooling equipments in rack rows and on rack front/back surfaces, and cooling devices of the equipment are also targets.

In a mode of the operations management apparatus 60, a common manager server or a history database is provided for the information-processing equipments of $20_1$ to $20_q$ and the facilities $40_1$ to $40_u$ and $50_1$ to $50_v$, or manager servers and history databases on both sides are linked together, and also, a manager function may be provided to a part of the equipments $20_1$ to $20_q$. The operations management apparatus according to the present embodiment can be achieved by, for example, implementing software, such as middleware, application, embedded control software, or firmware, onto a computer system. In some cases, an engine solving an optimization problem may be added as hardware. To allow a manager to obtain operational information of equipments and environmental information, each equipment and each facility is provided with an agent, a service processor, an interface, and others. Alternatively, the equipments and facilities may construct an autonomous distribution system.

Here, an effect of reducing a total power of the equipments and facilities in the present embodiment is exerted by adding means for finding an index value of a workload of the equipments, means for finding power efficiency of the equipments and facilities, means for finding workload allocation to the equipments and, in some cases, means for controlling operation of the equipments and facilities, and is not meant to be restricted by the equipment itself and the computing procedure described in the first embodiment and FIG. 1.

Second Embodiment

Figure 2:
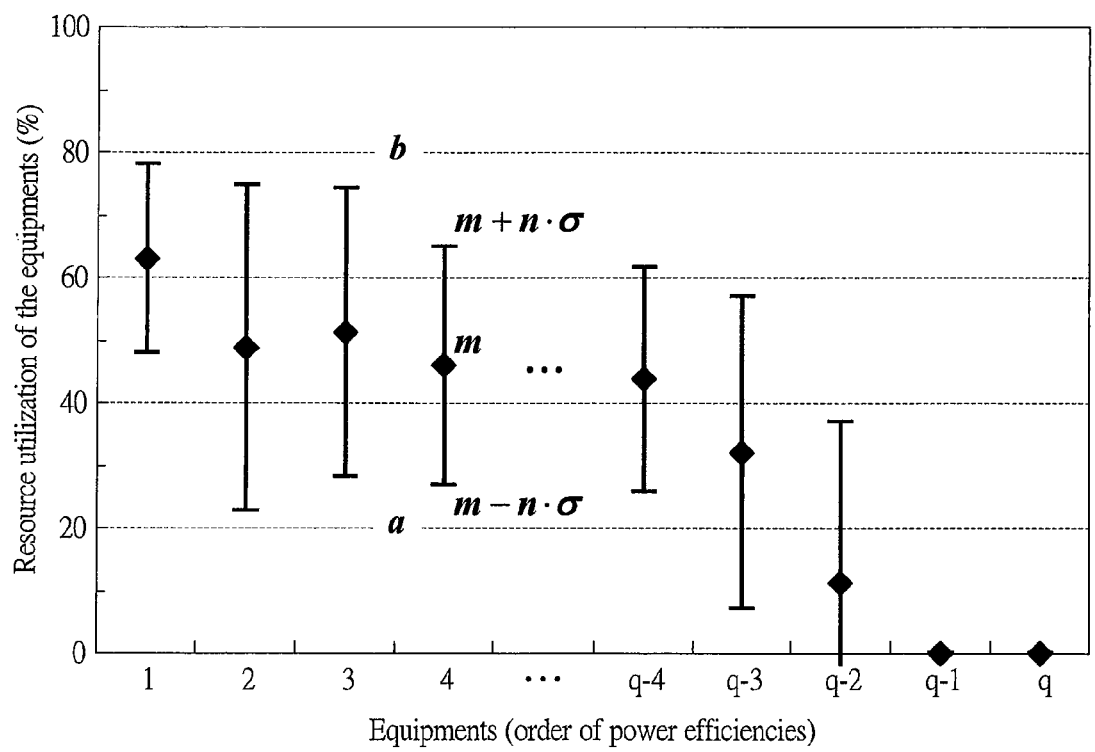
FIG. 2 is a descriptive diagram illustrating an example of a more detailed operation of workload allocating means for FIG. 1 in an operations management apparatus for an information-processing system according to a second embodiment of the present invention.

FIG. 2 is an explanatory diagram illustrating an example of more detailed operation of the workload allocating means 63 of FIG. 1 in an operations management apparatus for an information-processing system according to a second embodiment of the present invention. The horizontal axis of FIG. 2 represents equipments of $20_1$ to $20_q$ in the order of power efficiency also in consideration of power of the facilities, and the vertical axis represents a resource utilization, which is a variable representing the workloads $30_1$ to $30_r$. In the example of FIG. 2, a common threshold value range (for index value) is set in the equipments of $20_1$ to $20_q$ (with a lower limit a being 20% and an upper limit b being 80%), and one or a plurality of workloads are allocated to the equipments from equipment "1" with high power efficiency so that an index value $\xi$ ($=m\pm n\cdot\sigma$) of the resource utilization is within this threshold value range. Since choices of a workload within the threshold value range (for index value) is not present in equipments "q–3" and "q–2" an no workload to be allocated is present in equipments "q–1" and "q", by causing the equipment to be in stand-by or sleep or interrupting a power supply by the operation control means 65 of FIG. 1, power consumption can be reduced.

In FIG. 2, a workload is allocated with one variable representing the workloads $30_1$ to $30_r$. In some cases, a similar allocation procedure is performed so that the index value for a plurality of variable sets is limited within the threshold value range (for index value), and for example, a method can be taken in which an index value for a main variable regarding equipment power is limited within a threshold value range (for index value) for the purpose of simplification of allocation and no index value is found for other variables and a current value is determined based on a constraint (the threshold value range (for index value)). Also, although the lower limit "a" and the upper limit "b" are provided as a threshold value range (for index value) in FIG. 2, a method can be taken in which, only one threshold is set as needed, such as the type and processing mode of workload, for example, with the lower limit "a" being set as 0% or with only the upper limit "b" being set.

Third Embodiment

Figure 3:
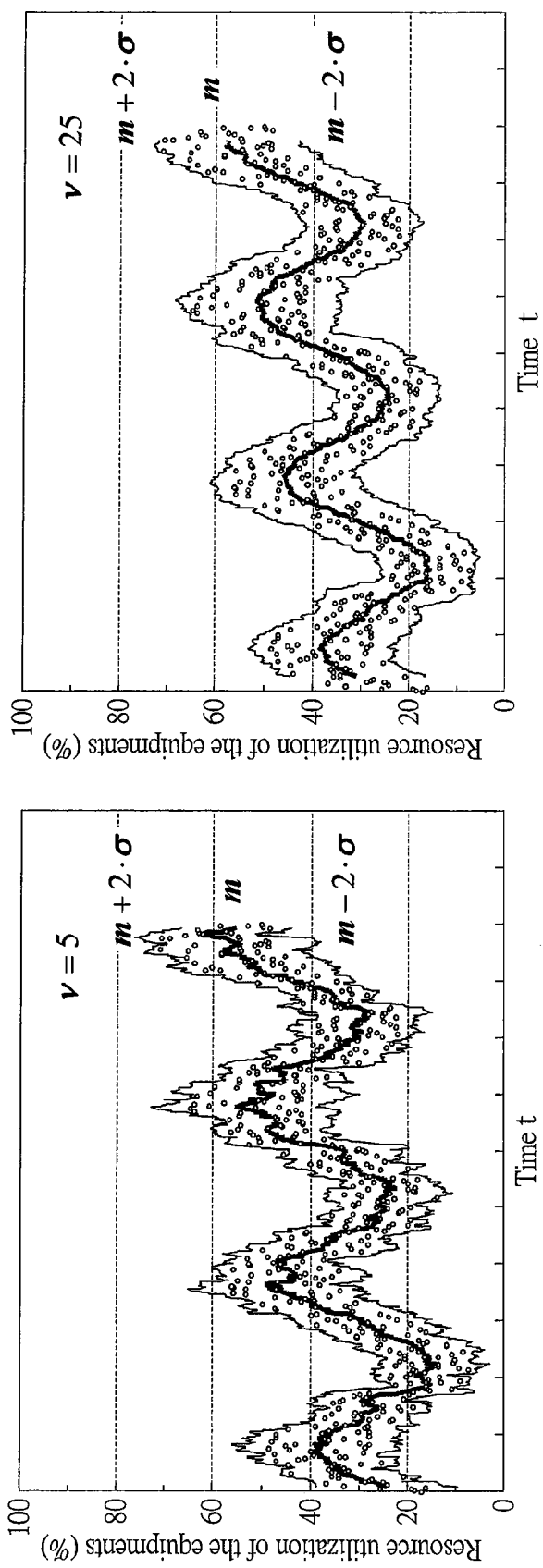
FIG. 3 is a descriptive diagram illustrating an example of a detailed operation of means for calculating a workload index value of FIG. 1 in an operations management apparatus for an information-processing system according to a third embodiment of the present invention.

FIG. 3 is an explanatory diagram illustrating an example of detailed operation of the computing means for the workload index value 62 of FIG. 1 in an operations management apparatus for an information-processing system according to a third embodiment of the present invention. FIG. 3 illustrates time series variations of a certain workload, illustrating resource utilization, which is a variable with the horizontal axis representing a time "t" and the vertical axis representing a workload. Hollow circular points represent a plot of history of workloads obtained from the history database 64 of FIG. 1, and the means 62 of computing a workload index value computes a moving average value "m" (a bold solid line) and a standard deviation $\sigma$ from this plot, and computes an index value $\xi$ ($=m\pm 2\cdot\sigma$) (thin solid lines) based on these moving average value "m" and the standard deviation $\sigma$. In the drawing on the left, five moving average values "m" and standard deviations $\sigma$ (five samples) of a history are used. In the drawing on the right, twenty-five moving average values and standard deviations (twenty-five samples) of a history found by repeating five moving averages twice are used. As evident when viewing FIG. 3, the workload in the near future is predicted as being moved substantially within a range of the index value $m\pm 2\cdot\sigma$. Therefore, by performing a workload allocation based on this, a reduction in power consumption and a sustainment of processing performance of the information-processing system can be both achieved with statistical likelihood.

In comparison between the drawings on the left and right, when the number of samples is small, it can be found that the moving average value tends to be influenced by local changes of the workload and a broad trend tends to be missed. Conversely, when the number of samples is substantially larger than that of the right drawing, a moving average waveform becomes blunt and is in danger of diverging from an actual change of the workloads. Therefore, the number of samples and the time intervals of the history are required to be set according to a rate of change and variations of the workloads. Also, if simple moving averaging is performed on many samples collectively at one time, a distortion occurs in an actual change. Therefore, in the right drawing, repetition of simple moving averaging is used. As another useful method, weighted moving averaging, exponential weighted moving averaging, or the like may be used.

Since the workloads in FIG. 3 are nearly in a normal distribution, $m\pm 2\cdot\sigma$ including 95% in a statistical sense is used as an index value. According to accuracy and reliability necessary for workload allocation, $\pm\sigma$ (68%) or $\pm 3\cdot\sigma$ (99%) is used in some cases. According to the distribution mode, in place of a moving average value, a moving median value or a moving mode value is used in some cases. Furthermore, in some cases, in order to improve statistical likelihood, a population is estimated for samples, and the standard error shown in Equation 9 and the population moving average value and the population standard error shown in Equation 10 are introduced as index values.

Here, an example of a trigger for changing workload allocation, in FIG. 3 is a case in which, for example, an index value (for example, an upper limit value $m+2\cdot\sigma$) calculated from a resource utilization history (corresponding to a history of a single or a plurality of workloads) at certain equipment deviates a threshold value range (for detection) of that equipment at a certain time t. An example of such a case is as follows. When the threshold value range (for index value) is set at 20% to 80% and the threshold value range (for detection) is set at 15% to 85%, workloads are allocated so that the upper limit ($m\pm 2\cdot\sigma$) of the index value for the certain equipment does not exceed 80%. Thereafter, however, the processing amount of the workloads is increased on the average and the calculated result of the upper limit ($m+2\cdot\sigma$) of the index value of the relevant workload reaches 85% at a certain time t. In this case, by way of example, based on the magnitude of the index value for each workload executed at each equipment at this time t and the ranking of power efficiency for each equipment, as described in the first embodiment, workloads are allocated in the order in which a larger workload is first allocated to equipment with higher power efficiency, or a deviated workload is once saved in equipment where no workload is currently allocated and then workload allocation in its entirety is performed again with the case in which the number of deviating workloads exceeds a certain predetermined value being taken as a trigger.

Also, in the description made above, it is assumed that workloads are allocated so that the upper limit ($m\pm 2\cdot\sigma$) of the index value is extremely closed to the upper limit (80%) of the threshold value range (for index value), and in order for a trigger for workload allocation not to occur immediately thereafter and continuously, in other words, in order to keep some degree of a trigger interval of changing workload allocation, the threshold value range (for detection) with a margin of 5% is set. However, on the other hand, since processing performance of the equipment may be in danger of decreasing within a range of this margin, the threshold value range (for index value) and the threshold value range (for detection) may be set equally. For example, when a moving average value of an index value of a workload makes a transition in a sine wave form and a trigger for workload allocation as described above occurs at a timing of increasing near the center of the amplitude of that sine wave, a trigger for changing workload allocation occurs after all sooner or later irrespectively of the presence or absence of the margin described above. On the other hand, when a trigger for workload allocation as described above occurs at a timing near a maximum peak of the amplitude of the sine wave, for example, a trigger for changing workload allocation does not occur irrespectively of the presence or absence of the margin described above.

Fourth Embodiment

Figure 4:
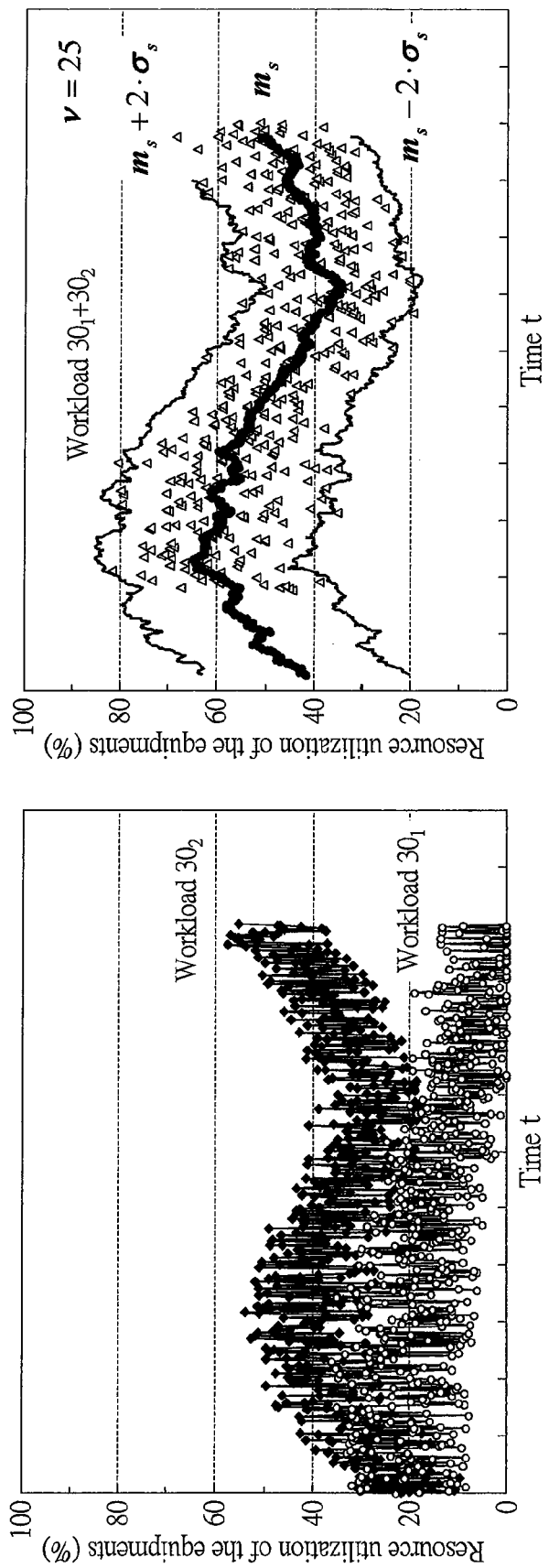
FIG. 4 is an explanatory diagram illustrating an example of a detailed operation of means for calculating a workload index value and workload allocating means for FIG. 1 in an operations management apparatus for an information-processing system according to a fourth embodiment of the present invention.

FIG. 4 is an explanatory diagram illustrating an example of detailed operation of the calculating means for the workload index value 62 and the workload allocation means 63 of FIG. 1 in an operations management apparatus for an information-processing system according to a fourth embodiment of the present invention. In the present embodiment, a situation is described in which the workload allocation means 63 allocates a plurality of workloads to one piece of equipment based on an index value calculated by means 62 of calculating a workload index value, and, as an example of that situation, a situation will be described in which workloads $30_1$ and $30_2$ are allocated to the equipment $20_1$ of FIG. 1. The horizontal axis of FIG. 4 represents a time "t", and the vertical axis thereof represents resource utilization, which is a variable of a workload. Diamond-shaped points and hollow circular points in the drawing on the left represent plots of a history of the workloads $30_1$ and $30_2$, respectively. Hollow triangular points in the drawing on the right represent a plot of history of a total of the workloads $30_1$ and $30_2$, and a bold solid line represents a composite moving average value $m_s$ obtained from Equation 11, and a thin solid line represents an index value $\xi_s$ ($=m_s\pm 2\cdot\sigma_s$) obtained from a composite moving average value $m_s$ and a composite standard deviation $\sigma_s$. As can be seen from the drawing on the right, by using the composite moving average value $m_s$ and the composite standard deviation $\sigma_s$, even when the plurality of workloads $30_1$ and $30_2$ are allocated to the equipment $20_1$, time-series changes of the total workload can be grasped for prediction.

In the example of FIG. 4, since the performance of the equipment handling the workloads $30_1$ and $30_2$ and the performance of the equipment $20_1$ have been equal to each other before allocation to the equipment $20_1$, when the workload allocation means 63 estimates workloads after allocation, a simple total value of the workloads $30_1$ and $30_2$ is applied to the equipment $20_1$, but if the performances are different from each other, in place of a simple total, a conversion as expressed in Equation 12 is required to be performed. For example, when a workload of a CPU utilization of 40% is transferred from the equipment having a processing performance ratio of 1 to equipment having a performance ratio of 2, a conversion can be made with a CPU utilization being taken as 20%.

Fifth Embodiment

Figure 5:
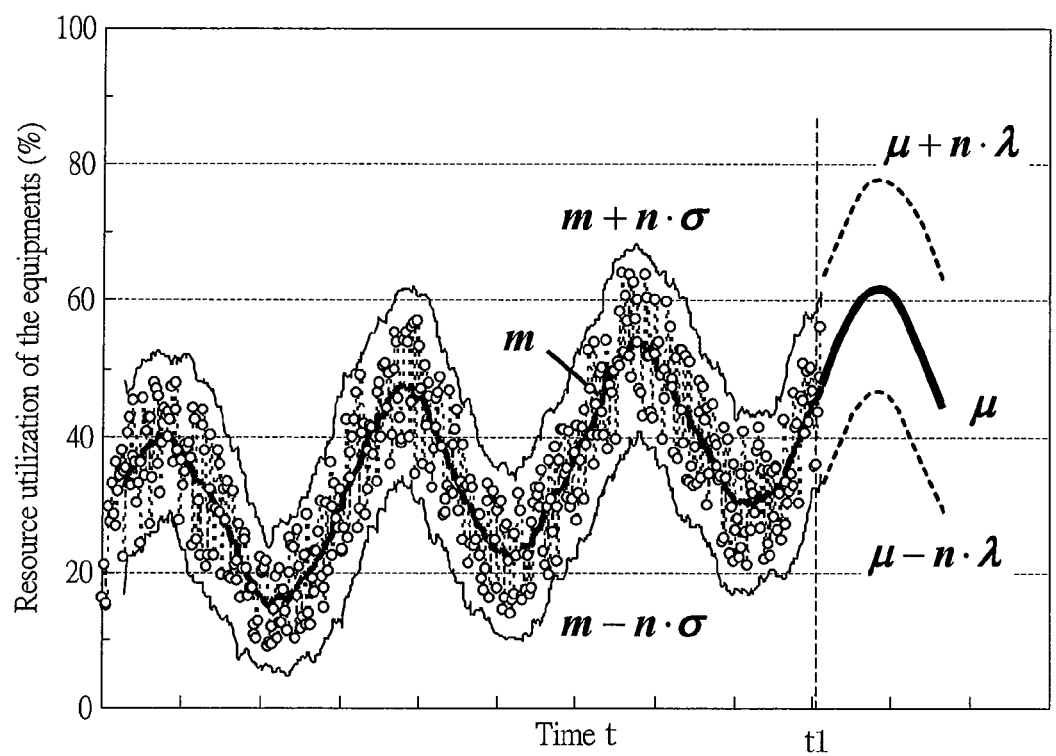
FIG. 5 is a descriptive diagram illustrating an example of detailed operation of means for calculating a workload index value of FIG. 1 in an operations management apparatus for an information-processing system according to a fifth embodiment of the present invention.

FIG. 5 is an explanatory diagram illustrating an example of detailed operation of the computing means for the workload index value 62 of FIG. 1 in an operations management apparatus for an information-processing system according to a fifth embodiment of the present invention. In the present embodiment, the computing means for the workload index value 62 predicts a future transition of workloads to some degree to define an index value. FIG. 5 illustrates time-series changes of a certain workload, with horizontal axis representing a time "t", the vertical axis representing a resource utilization, which is a variable of the workload, and hollow circular points representing a plot of a history of the workload. Also, a bold solid line at a history time "t1" represents a moving average value m, a thin solid line represents an index value $\xi$ ($=m\pm n\cdot\sigma$) obtained from a moving average value "m" and a standard deviation $\sigma$. A bold solid line at a time "t" prior to the history time t1 represents a predicted value $\mu$ obtained from an autoregressive integrated moving average model, and a thin dotted line represents an index value $\xi$ ($=\mu\pm n\cdot\lambda$) obtained from the predicted value $\mu$ and a confidence interval $\lambda$ as expressed in Equation 16.

As illustrated in FIG. 5, by predicting further workloads with statistical likelihood, while the system processing performance of the equipments is more adequately ensured, a total power consumption combining the equipments and, furthermore, power supplying/cooling facilities, can be reduced. That is, for example, when it is predicted that an amount of processing workloads will be increased in the future, the workloads can be allocated to equipment with a margin of that increasing amount, and consequently, the probability that each equipment exceeds its own processing performance (deviates from the threshold value range (for detection)) can be reduced and, as a whole, a high system processing performance can be continuously maintained. Furthermore, when an increase of workloads is predicted, by using the operation control means 65, the equipments and facilities are caused to wait in advance. When a decrease is predicated, power-saving of the equipments and facilities can also be performed. Although an autoregressive integrated moving average model is used in FIG. 5, a simple regression model or exponential smoothing may be used according to a necessary predicted period or confidence interval, or a Bayesian approach or the like of combining a plurality of models in order to increase predictability may be used.

Here, when a future prediction is used with respect to thee cooling facilities, the operating control means 65 is preferably used to control the operating capability and the number of operating cooling facilities in advance in consideration of a thermal time constant. Since there is a heat capacity in the facility environment where the equipments is placed, the temperature is changed with a delay by a thermal time constant even when the workloads and power consumption are fluctuated, and therefore, for example, a cooling facility is started up as being delayed upon a prediction of an increase of workloads, and is shut down early upon a prediction of a decrease. In this manner, power saving can be achieved as compared with follow-up-like control. Also, since temporally-detailed changes of the workloads and power consumption do not affect the cooling facilities, it is useful to use a moving average value of an interval corresponding to the thermal time constant.

For example, when the cooling equipment is formed of a plurality of air conditioners, the number of operating air conditioners and the cooling capability of each of the air conditioners are controlled in advance. As for a workload prediction, a moving average value is obtained in an interval corresponding to a thermal time constant and, changes of power of the equipments, that is, heat value, are estimated from a relational expression between that moving average value and equipment power with respect to the workload amount, and, according to a function responding to those changes with the thermal time constant, the number of operating facilities and cooling capability can be controlled. The heat value obtained from the moving average value of the thermal time constant changes more gradually than the moving average value of the workload amount itself, and this substantially represents a thermal load with respect to the air conditioners group. For example, when the power of the equipments changes stepwise, as a response function of a thermal time constant τ, an exponential function $e^{-t/\tau}$ is preferably used. As a simpler control method, the number of operating facilities is made substantially proportional to the response function, and the power of the air conditioners group is preferably reduced by, for example, making a delay by a time period corresponding to the thermal time constant τ to start up a non-operation air conditioner as to a prediction of an increase of workloads, and, stopping a part of the operating air conditioners group early by a time period corresponding to the thermal time constant τ as to a decrease prediction.

Sixth Embodiment

FIG. 6 is a descriptive diagram illustrating an example of detailed operation of the means 62 of calculating a workload index value of FIG. 1 in an operations management apparatus for an information-processing system according to a sixth embodiment of the present invention. In the present embodiment, the history of the workloads is assumed to have periodicity, and the means 62 of calculating a workload index value calculates an index value by reflecting this history. In FIG. 6, the drawing on the upper left illustrates a history at a time "t" of a certain workload, the drawing at the center illustrates a history at a time t one day before the day of the drawing on the upper left, and the drawing on the lower right illustrates a history at a time t one week before the drawing on the upper left. As illustrated in FIG. 6, when a time-series change of the workload has a one-day cycle, by calculating a summary statistic with reference to a history a predetermined number of days back from one day before, accuracy of predicting an index value can be improved. When a summary statistic is calculated, the history to be referred to may be weighted in consideration of an autocorrelation coefficient. For a burst-like regular workload as seen in part of FIG. 6, in place of obtaining a summary statistic, a method of registering a continuous time of the workload in a schedule in advance may be adopted.

Seventh Embodiment

FIG. 7 is a layout diagram illustrating an example of arrangement structure of an entire information-processing system in an operations management apparatus for the information-processing system according to a seventh embodiment of the present invention. An information-processing system 210 includes an information-processing equipments; rack rows $220_1$ to $220_{10}$ on which these equipments are mounted; a power facility formed of a transformer 240, an uninterruptible power supply apparatus 241, and switchboards $242_1$ to $242_4$; and a cooling facility formed of a cooling tower 250, chiller 251, and air conditioners $252_1$ to $252_6$. The power facility feeds power from the transformer 240 via the uninterruptible power supply 241 and the switchboards $242_1$ to $242_4$ to the rack rows $220_1$ to $220_{10}$, and further feeds power from a power distributing unit of each rack to the information-processing equipment. The cooling facility performs underfloor air conditioning. The air conditioners $252_1$ to $252_6$ supply cold air via underfloor and a grill to the equipments. The air conditioners $252_1$ to $252_6$ draws warm air in, the chiller 251 and the cooling tower 250 performs a heat exchange with each other, and the cooling tower 250 dissipates heat to outside air.

For example, when the equipment i $221_i$ is positioned at a rack row $220_7$, the power facility feeds power as indicated by an arrow 243 from the transformer 240 via the uninterruptible power supply 241 and the switchboard $242_3$ to the equipment i $221_i$. The power consumed by the equipment i $221_i$ is changed to sensible heat to heat air. In the cooling facility, cold air is supplied from the air conditioners $252_1$ to $252_6$ via underfloor and grills to the equipment i $221_i$, warm air by the equipment i $221_i$ returns to the air conditioners $252_1$ to $252_6$ as indicated by arrows $254_1$ to $254_6$, and heat blotted by the air conditioners $252_1$ to $252_6$ is discharged via the chiller 251 and the cooling tower 250 to outside air. By recognizing the arrangement of the power supplying system and the cooling system with respect to the equipment i $221_i$ in this manner, partial sensitivity of a power-supplying loss and cooling power with respect to the equipment i $221_i$ can be calculated.

Although not restricted, specifically, for example, an element function $p_{Si}$ of the power facility with equipment "i" as a target (approximately, a function of power and a position $x_i$ of the equipment i) is obtained by performing a simulation in advance with the power of the equipment i along the power supplying system indicated by the arrow 243. Similarly, an element function $p_{Ci}$ of the cooling facility with the equipment i as a target (approximately, a function of power and the position $x_i$ of the equipment i) is obtained by performing a simulation in advance with the power of the equipment i in consideration of an influence of thermal load given by the equipment i to the air conditioners $252_1$ to $252_6$ as indicated by the arrows $254_1$ to $254_6$. And, with a sum ($p_{Si}+p_{Ci}$) of these element functions being taken as a partial sensitivity $P_{Fi}$ of the facility power $P_F$, power efficiency for each equipment together with a power-supplying loss and cooling power can be obtained as Equation 6 and Equation 13. Also, similarly, regarding other equipments, power efficiency for each equipment together with a power-supplying loss and cooling power can be obtained. Based on this power efficiency, by performing a workload allocation as described in each embodiment described above, it is possible to reduce a total power consumption of the equipments, the power facilities and the cooling facilities without decreasing system processing performance of the equipments.

In the foregoing, the invention made by the inventors of the present invention has been concretely described based on the embodiments. However, it is needless to say that the present invention is not limited to the foregoing embodiments and various modifications and alterations can be made within the scope of the present invention.

INDUSTRIAL APPLICABILITY

The present embodiments can be applied to integrative power-conscious operations management in an information-processing system formed of an information-processing equipments, such as a server, a storage, and a network; and a power facility and a cooling facility and, in particular, the present embodiments are suitable for a data center, which is an information-processing infrastructure. Also, the present embodiments are used for autonomous operations management of the information-processing system, and can be applied to a wide range of use purpose as a system analysis tool or an auxiliary tool for operative administrators and facility administrators.

The present embodiments can be applied not only to the equipments and facilities disposed at one location but also to workload allocation to a plurality of location. For example, they are useful in a data center with a plurality of floors and a globally-separated data center, and can be utilized when information-processing equipments and facilities are scattered, as with the case of grid computing or cloud computing. Furthermore, although the present embodiments are targeted mainly for the information-processing equipments and facilities, the present embodiments can be applied to equipments which consume electric power or energy and facilities for these equipments and, for example, the present embodiments can also be used for operation and control of electrical equipment, mechanical equipment, a power unit, a thermal unit, and others; and, the present embodiments can contribute to power saving and energy saving for the system size targeting: an electronic component group and a power supply or a cooler; an information-processing module group and a power supply unit and/or a cooling unit; and a data center group and a power plant or a cooling environment including site selection being taken as a system size.

The invention claimed is:

1. An operations management apparatus for an information-processing system having a plurality of information-processing equipments, comprising:
a first unit that obtains and stores a history of a time series variation in processing amounts of the information-processing equipments for each workload of the information-processing equipments by monitoring a first variable provided by the information-processing equipments;
a second unit that calculates a summary statistic including a central tendency and a dispersion of the processing amounts for the respective workloads of the information-processing equipments based on the history;
a third unit that preferentially allocates, in order, workloads to an information-processing equipment whose power efficiency is higher with respect to equipment performance among the information-processing equipments insofar as an expected value based on the summary statistic for workloads to be allocated to each information-processing equipment is within a threshold range preset for each information-processing equipment.

2. The operations management apparatus for the information-processing system according to claim 1,
wherein the information-processing equipments are servers, and
wherein the first variable is a processor utilization.

3. The operations management apparatus for the information-processing system according to claim 1,
wherein the information-processing equipments are servers, and
wherein the workloads are applications.

4. The operations management apparatus for the information-processing system according to claim 1,
wherein the central tendency of the throughputs for the respective workloads is a moving average deviation of the throughputs for the respective workloads.

5. The operations management apparatus for the information-processing system according to claim 1,
wherein the dispersion of the throughputs for the respective workloads is a standard deviation of the throughputs for the respective workloads.

6. The operations management apparatus for the information-processing system according to claim 1,
wherein the information-processing equipment whose power efficiency is higher with respect to equipment performance among the information-processing equipments to which the third unit gives preference is an information processing equipment whose processing performance per unit power consumption is higher among the information-processing equipments.

7. The operations management equipment for the information-processing system according to claim 6,
wherein the unit power consumption relating to each information-processing equipment is a unit power consumption relating to power consumed by each information-processing equipment.

8. The operations management equipment of an information-processing system according to claim 6,
wherein the information-processing system includes cooling facilities that cool the information-processing equipments, and
wherein the unit power consumption relating to each information-processing equipment is a unit power consumption relating to power consumption for each information-processing equipment including equipment power consumed by each information-processing equipment and power consumed by the cooling facilities.

9. The operations management apparatus for the information-processing system according to claim 8,
wherein the cooling facilities include an air conditioner.

10. The operations management apparatus for the information-processing system according to claim 6,
wherein the information-processing system includes facilities which feed power to the information-processing equipments, and
wherein the unit power consumption relating to each information-processing equipment is a unit power consumption relating to power consumption for each information-processing equipment including equipment power consumed by each information-processing equipment and power consumed by the facilities for supplying the equipment power.

11. The operations management apparatus for the information-processing system according to claim 6,
wherein the information-processing system includes equipment for feeding power to the information-processing equipments and cooling the information-processing equipments, and
wherein the unit power consumption relating to each information-processing equipment is a unit power consumption relating to power consumption of each information-processing equipment including equipment power consumed by each information-processing equipment, power consumed by the facilities for supplying the equipment power, and for cooling the generated heat corresponding to the equipment power.

12. The operations management apparatus for the information-processing system according to claim 1,
wherein the expected value is a value obtained by adding a constant multiple of a dispersion of the throughputs for the workloads to be allocated to each information-processing equipment to a central tendency of the throughputs for the workloads to be allocated to each information-processing equipment.

13. The operations management apparatus for the information-processing system according to claim 12,
wherein the central tendency of the throughputs for each of the workloads is a moving average deviation of the throughputs for each of the workloads,
wherein the dispersion of the throughputs for each of the workloads is a standard deviation of the throughputs for each of the workloads, and
wherein a constant of the constant multiple ranges from 1 to 3.

14. The operations management apparatus for the information-processing system according to claim 1,
wherein a central tendency of the throughputs for each of the workloads is a moving average deviation of the throughputs for each of the workloads, wherein a dispersion of the throughputs for each of the workloads is a standard deviation of the throughputs for each of the workloads, and wherein, when a plurality of workloads are to be allocated to one of the information-processing equipments, the expected value relating to the one of the information-processing equipments is a value obtained by adding a constant multiple of combined standard deviation of the throughputs for the workloads to a combined moving average deviation of the throughputs for the workloads.

* * * * *